United States Patent
Burgard

(10) Patent No.: US 7,662,867 B2
(45) Date of Patent: Feb. 16, 2010

(54) ACCELERATED UV CURING

(75) Inventor: Detlef Burgard, Völklingen (DE)

(73) Assignee: Air Products and Chemicals, Inc., Allentown, PA (US)

( * ) Notice: Subject to any disclaimer, the term of this patent is extended or adjusted under 35 U.S.C. 154(b) by 22 days.

(21) Appl. No.: 11/815,109

(22) PCT Filed: Feb. 7, 2006

(86) PCT No.: PCT/EP2006/050730

§ 371 (c)(1), (2), (4) Date: Nov. 13, 2007

(87) PCT Pub. No.: WO2006/084848

PCT Pub. Date: Aug. 17, 2006

(65) Prior Publication Data

US 2008/0064781 A1 Mar. 13, 2008

(30) Foreign Application Priority Data

Feb. 9, 2005 (DE) .................. 10 2005 005 976

(51) Int. Cl.
*C08F 2/50* (2006.01)
(52) U.S. Cl. ..................... 522/66; 522/29; 522/104; 522/178; 522/182; 522/902; 522/71; 522/81
(58) Field of Classification Search .............. 522/66, 522/71, 81, 104, 29, 178, 182, 902; 523/137
See application file for complete search history.

(56) References Cited

U.S. PATENT DOCUMENTS

| 5,003,016 A | * | 3/1991 | Boeder ............... 526/208 |
| 5,925,453 A | | 7/1999 | Kase et al. |
| 6,191,884 B1 | | 2/2001 | Takizawa et al. |

FOREIGN PATENT DOCUMENTS

| DE | 4447726 B4 | 4/1995 |
| DE | 10327919 A1 | 1/2005 |
| EP | 0281365 B1 | 9/1988 |

OTHER PUBLICATIONS

Periodic Table. Wikipedia, the free encyclopedia [online], [retrieved on Mar. 14, 2009]. Retrived from <URL:http://en.wikipedia.org/wiki/Periodic_table.com>.*

Chowdhury P. et al.; "The Cross-Linking of Acrylic Rubber in the Presence of Group IIB Metal Oxides"; Journal of Applied Polymer Science, John Wiley & Sons Inc, NY,USA; vol. 52, No. 9, pp. 1233-1240; May 31, 1994.

* cited by examiner

*Primary Examiner*—Sanza L McClendon
(74) *Attorney, Agent, or Firm*—Harness, Dickey & Pierce, PLC

(57) ABSTRACT

The invention relates to the use of an infrared absorber for accelerating the UV curing of a mass to be cured. The infrared absorber is preferably selected from ATO, ITO, ZnO, $LaB_6$ and a mixture of said substances. A casting resin is preferably used as the mass to be cured, in particular a resin based on an acrylic resin or an acrylate resin. The invention permits the production of laminated panes, in which the starting mass is applied between the panes and converted to form the laminate.

6 Claims, 3 Drawing Sheets

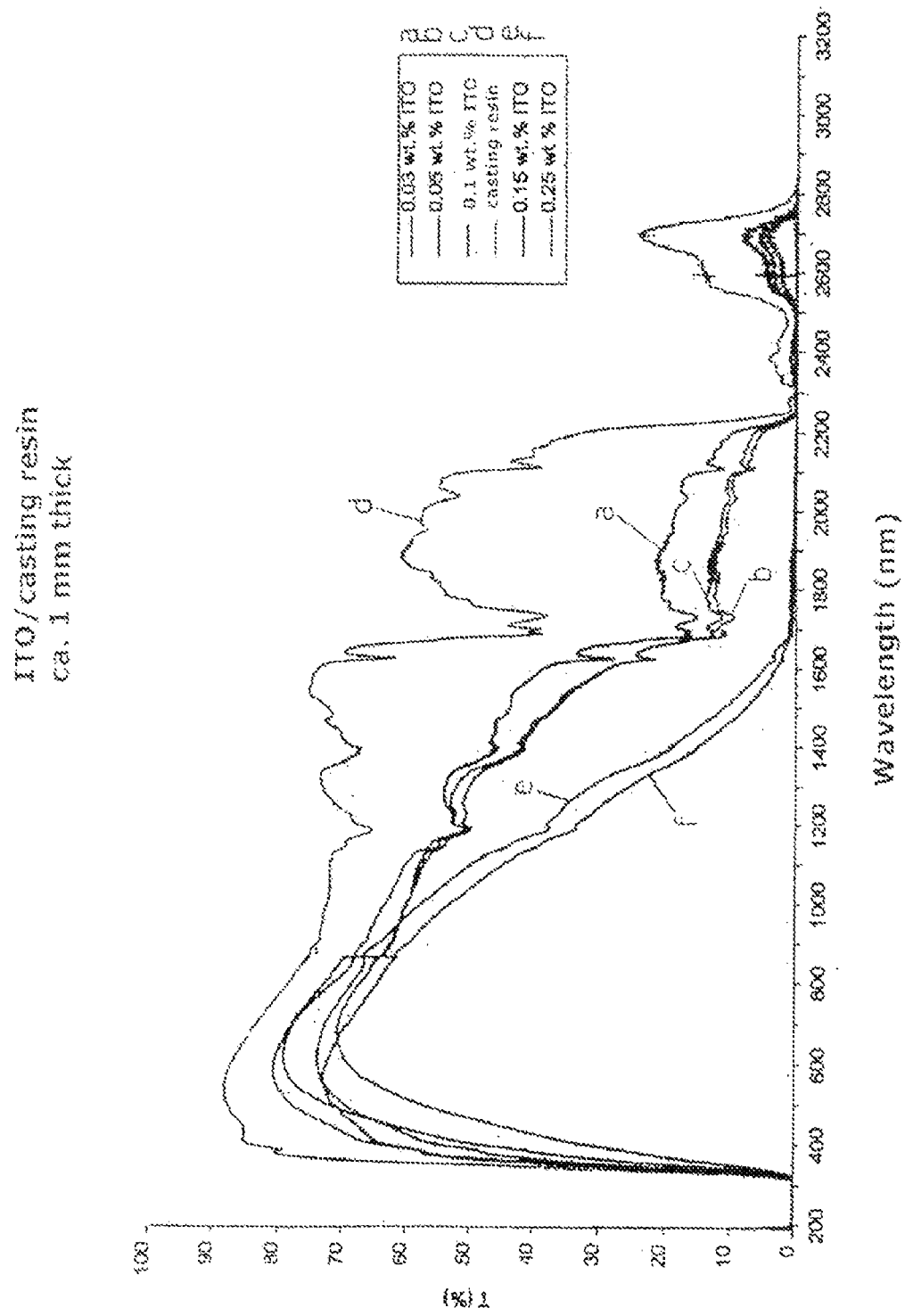

ACCELERATED UV CURING

The present invention relates to the use of IR absorbers for accelerating the UV curing of compositions to be cured.

BACKGROUND

Compound glasses are per se known. They usually consist of two spaced glasses firmly interconnected through an intermediate composition, for example, to provide a light-weight unbreakable arrangement. Already now, for example, in carriage construction, compound glasses are prepared by casting a casting resin between two glasses which may consist of flat glass (float glass) and/or plastic. The casting resin is then cured by UV irradiation, which causes bonding.

To achieve a thorough curing, very strong UV lamps and undesirably long irradiation times are required. This adds to the cost of compound glass arrangements and thus limits their utility. The same applies to applications other than compound glass production in which compositions are changed by UV irradiation.

UV-curing transparent paint and resin systems enjoy great popularity because mostly no solvents are necessary, shorter drying/curing times can be achieved, and the installation is often less expensive.

In the known systems, the cross-linking of the systems is initiated by UV light. In addition to ultraviolet light, UV lamps also emit some proportion of IR radiation (for example, metal-vapor lamps). To date, the IR radiation has not been well absorbed by the photoinitiators or other previously employed photoactive materials. As a rule, UV radiation is absorbed only shortly even by the photoinitiator, which quickly decomposes and subsequently does not absorb any longer.

SUMMARY

It is the object of the invention to achieve a particularly quick UV curing of casting resin compositions in which UV and IR radiations can be absorbed and converted to heat during the whole curing reaction.

This object is achieved by the use of an infrared absorber for accelerating the UV curing of a composition to be cured.

The infrared absorber employed advantageously is a pigment that absorbs both UV and IR radiation while it preferably is substantially transparent in the visible wavelength region of light.

Since the sheer absorption is preferably very high in the UV and IR regions of the wavelength spectrum (for example, at least 70% of the incident light), heating of the casting resin composition occurs.

DRAWINGS

In the following, the invention is described by means of an Example with reference to the Figures. In the Figures:

FIG. 3 shows the transmission through a 1 mm thick layer of casting resin for different contents of indium tin oxide IR absorber.

DETAILED DESCRIPTION

Figure 1:
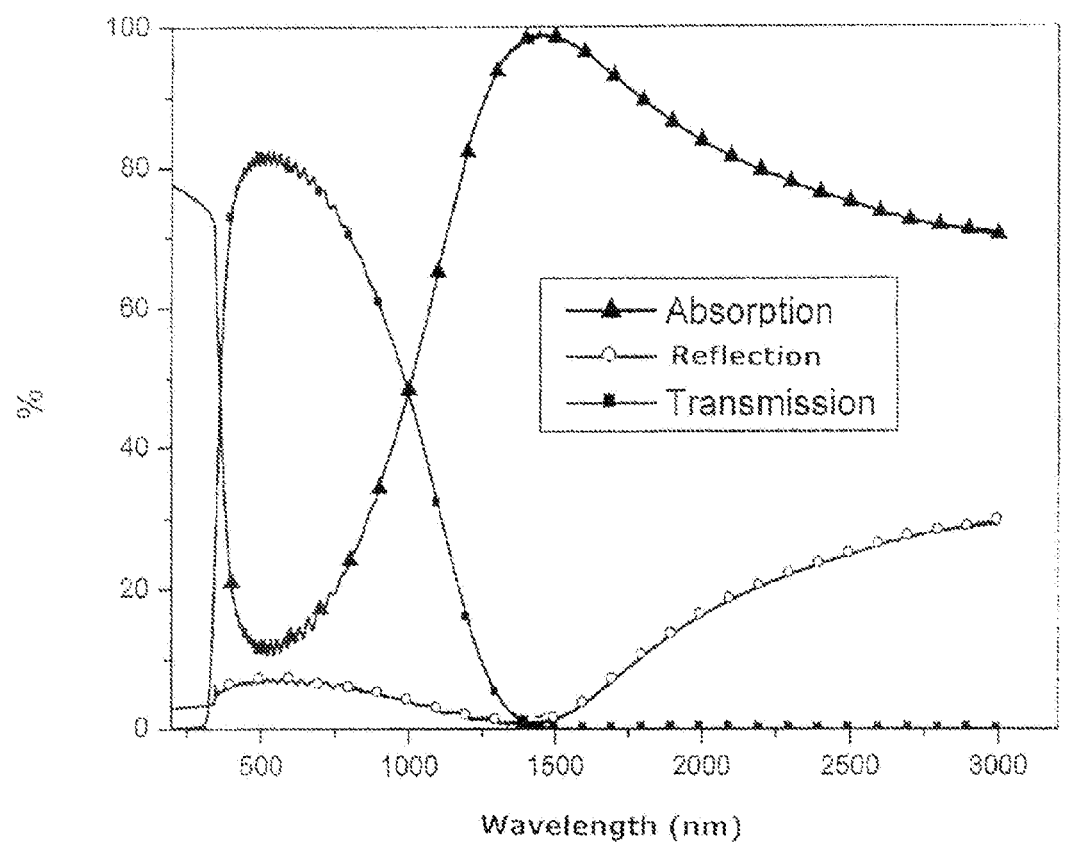
FIG. 1 shows measuring curves for reflection, absorption and transmission (ITO layers of nano-ITO)

According to the invention, casting resin compositions (or casting resins in general) are generally UV-cross-linkable systems, especially including acrylate systems, and also include, for example, paints, especially acrylate-based paints.

Thus, materials having an appropriate absorption behavior are advantageously suitable for this purpose. Such materials may advantageously be used singly or as a mixture and selected from inorganic UV absorbers (for example, ZnO) and IR absorbers (organic or inorganic).

For example, this enables a process for preparing compound glasses in which a starting composition is provided between glasses and reacted for bonding, wherein UV light from a broad-band energy source is irradiated onto the starting composition and wherein the starting composition is provided with an IR absorber before the UV irradiation, in order to absorb IR radiation from said broad-band energy source in the starting composition during the reaction and absorb heat in the cured composition of the compound glass.

It is essential to recognize that said curing can be accelerated significantly by the presence or admixture of even a very small amount of an infrared absorber. This recognition is not limited to the preparation of compound glasses, but it provides for particular advantages in this field. The introduction of an IR absorber in a composition to be cured significantly reduces the irradiation time while the curing results are the same, even though the actual curing does not occur by heating, but by some reaction activated in a different region, which offers significant advantages with respect to installation technology and production times. In terms of process technology, use is made of the fact that the typically employed energy sources for UV light irradiation of the starting composition operate in a broad band fashion, which is the case, for example, in metal vapor lamps, especially mercury vapor lamps, in the preferred case, whereby UV and IR are irradiated simultaneously.

The starting composition will typically include a composition comprising a UV-sensitive photoinitiator that per se has, in particular, a certain temperature sensitivity which is not too low, i.e., proceeds through the desired curing reaction more quickly and/or differently at different temperatures due to the UV light. Composition or photoinitiators particularly suitable for the purpose of the invention exhibit a large variation of sensitivity with temperature.

In a preferred variant, the IR absorber has a UV-resistant design so as to be active throughout the irradiation time, unlike the photoinitiator, which is typically degraded in the course of the curing or reaction of the starting composition. Due to the fact that the temperature of the starting composition or the reacting photosensitive components of the starting composition increases due to the IR absorption during irradiation in the course of the reaction, increase which is often even significant and measurable, the concentration decrease from degradation of the photoinitiator can be compensated for to such an extent that increased reaction rates are obtained for the respectively remaining amounts of the photoinitiator. Already for small amounts of suitable absorbers, the heating is faster to such an extent that it remains restricted to the starting composition locally at least to a substantial extent, which is advantageous, because coupling of heat into objects to be bonded, sealed or cast thus does not, or not significantly, occur, especially if these glasses used for compound glasses typically have a low thermal conductivity.

It is possible to use casting resin, especially one based on acrylic or acrylate resin, as the starting composition, which is preferred because such starting compositions are, or can be chosen to be, sufficiently transparent to ultraviolet, visible and infrared light. In such compositions, the preferred use of inorganic infrared absorbers is also possible, i.e., especially when dispersing aids are used that allow the preferred quite uniform distribution of particles having a small size to thus enable a uniform input of IR radiation. Thus, the infrared absorber can and will preferably be distributed or dispersed homogeneously.

Said IR absorber will preferably be a transparent conductive oxide provided with suitable dispersing agents, especially ATO, ITO, ZnO, but also LaB6 and/or mixtures of and/or with these substances and/or encapsulated forms of such substances and/or mixtures. Even at higher concentrations thereof, it is possible to select the corresponding dispersing aid in such a way that the IR absorber remains sufficiently finely distributed in the starting composition during the reaction, so that it will absorb heat also in the cured composition of the compound glass and thus is capable of at the same time providing a further, typically desired, property in addition to the acceleration of the curing reaction and thus cost reduction of the products (for example, compound glass). The IR absorber will typically be nanoparticular, i.e., have sizes of from 10 nm to the μm range, respectively based on its individual particles and/or agglomerates thereof, thus ensuring a property of being readily distributed in the casting resin composition or its precursors.

In smaller amounts however, it is just these materials that show ideal properties to achieve the desired IR absorption during the reaction; the amounts of such materials can be kept low enough to be able to avoid impairment of any existing surface or bulk properties, such as static chargeability, transparency to radio waves, especially in GSM bands and the like.

What IR absorbers, starting compositions and dispersing aids are used highly depends on the intended use of the glasses or other materials to be bonded, sealed or altered etc. However, it is obvious that varying starting compositions, if needed, may require systems of different dispersing agents. In this connection, it may also be noted that the infrared absorber of the present invention can be mixed with the casting resin in any order in typical systems.

However, acrylates are preferably selected from the group consisting of 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicyclopentenyl di(meth)acrylate modified with caprolactam, phosphoric acid di(meth)acrylate modified with ethylene oxide, cyclohexyl di(meth)acrylate modified with an allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate, dipentaerythritol hexa(meth)acrylate modified with caprolactam, (meth)acrylate esters, monofunctional (meth)acrylates, such as methyl (meth)acrylate, ethyl (meth)acrylate, isopropyl (meth)acrylate, 2-ethylhexyl (meth)acrylate, butyl (meth)acrylate, cyclohexyl (meth)acrylate, tetrahydrofurfuryl (meth)acrylate, 2-hydroxyethyl (meth)acrylate, 2-hydroxypropyl (meth)acrylate, polyethylene glycol mono(meth)acrylate, methoxypolyethylene glycol mono(meth)acrylate, polypropylene glycol mono(meth)acrylate, polyethylene glycol polypropylene glycol mono(meth)acrylate, polyethylene glycol polytetramethylene glycol mono(meth)acrylate and glycidyl (meth)acrylate; difunctional (meth)acrylates, such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, neopentyl glycol di(meth)acrylate, allyl (meth)acrylate, bisphenol-A di(meth)acrylate, ethylene oxide-modified bisphenol-A di(meth)acrylate, polyethylene oxide-modified bisphenol-A di(meth)acrylate, ethylene oxide-modified bisphenol-S di(meth)acrylate, bisphenol-S di(meth)acrylate, 1,4-butanediol di(meth)acrylate and 1,3-butylene glycol di(meth)acrylate; and tri- and higher-functional (meth)acrylates, such as trimethylolpropane tri(meth)acrylate, glycerol tri(meth)acrylate, pentaerythritol tri(meth)acrylate, pentaerythritol tetra(meth)acrylate, ethylene-modified trimethylolpropane tri(meth)acrylate, dipentaerythritol hexa(meth)acrylate, 2-hydroxyethyl (meth)acrylate, 2-hydroxypropyl (meth)acrylate, isobutyl (meth)acrylate, t-butyl (meth)acrylate, 2-ethylhexyl (meth)acrylate, stearyl acrylate, 2-ethylhexylcarbitol acrylate, omega-carboxy-polycaprolactam monoacrylate, acryloyloxyethylic acid, acrylic acid dimer, lauryl (meth)acrylate, 2-methoxyethyl acrylate, butoxyethyl acrylate, ethoxyethoxyethyl acrylate, methoxytriethylene glycol acrylate, methoxy polyethylene glycol acrylate, stearyl (meth)acrylate, cyclohexyl (meth)acrylate, tetrahydrofurfuryl (meth)acrylate, N-vinyl-2-pyrrolidone, isobornyl (meth)acrylate, dicyclopentenyl acrylate, benzyl acrylate, phenylglycidyl ether epoxy acrylate, phenoxyethyl (meth)acrylate, phenoxy (poly)ethylene glycol acrylate, nonylphenol-ethoxylated acrylate, acryloyloxyethylphthalic acid, tribromophenyl acrylate, tribromophenol-ethoxylated (meth)acrylate, methyl methacrylate, tribromophenyl methacrylate, methacryloxy-ethylic acid, methacryloyloxyethylmaleic acid, methacryloyloxyethylhexahydrophthalic acid, methacryloyloxyethylphthalic acid, polyethylene glycol (meth)acrylate, polypropylene glycol (meth)acrylate, beta-carboxyethyl acrylate, N-methylolacrylamide, N-methoxymethylacrylamide, N-ethoxymethylacrylamide, N-n-butoxymethylacrylamide, t-butylacrylamidosulfonic acid, vinyl stearate, N-methylacrylamide, N-dimethylacrylamide, N-dimethylaminoethyl (meth)acrylate, N-dimethylaminopropylacrylamide, acryloylmorpholine, glycidyl methacrylate, n-butyl methacrylate, ethyl methacrylate, allyl methacrylate, cetyl methacrylate, pentadecyl methacrylate, methoxypolyethylene glycol (meth)acrylate, diethylaminoethyl (meth)acrylate, methacryloyloxyethylsuccinic acid, hexanediol diacrylate, neopentylglycol diacrylate, triethyleneglycol diacrylate, polyethylene glycol diacrylate, polypropylene glycol diacrylate, penta-erythritol diacrylate monostearate, glycol diacrylate, 2-hydroxyethyl-methacryloyl phosphate, bisphenol-A ethylene glycol adduct acrylate, bisphenol-F ethylene glycol adduct acrylate, tricyclodecanemethanol diacrylate, trishydroxyethylisocyanurate diacrylate, 2-hydroxy-1-acryloxy-3-methacryloxy propane, trimethylolpropane triacrylate, trimethylolpropane ethylene glycol adduct triacrylate, trimethylolpropanepropylene glycol adduct triacrylate, pentaerythritol triacrylate, trisacryloyloxyethyl phosphate, trishydroxyethylisocyanurate triacrylate, modified epsilon-caprolactam triacrylate, trimethylolpropane ethoxy triacrylate, glycerol propylene glycol adduct triacrylate, pentaerythritol tetraacrylate, pentaerythritol ethylene glycol adduct tetraacrylate, ditrimethylolpropane tetraacrylate, dipentaerythritol hexa(penta)acrylate, dipentaerythritol monohydroxy pentaacrylate, urethane acrylate, epoxy acrylate, polyester acrylate, unsaturated polyester acrylate.

Further, the photoinitiator may preferably be selected from the group consisting of benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl 2-hydroxy-2-propyl ketone, benzophenone, p-phenylbenzophenone, 4,4'-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylaminobenzoate.

The amount of infrared absorber, especially of transparent conductive oxide, will typically be from 0.005% by weight to 5% by weight of the casting resin composition, where even lower amounts hardly contribute to any significant improvements of the curing time, while at higher concentrations typically no further advantages appear, if corresponding layer thicknesses are employed, and moreover, it cannot be excluded that the overall resistance of the compound glass or other system is not maintained to the same extent or at least to almost the same extent as without admixture.

However, just for very low concentrations, it is surprising that a significant shortening of the process times can be achieved, which leads to an overall cost reduction. This can be the case already if so low an amount of absorber is added that no substantial changes of properties are found in the final product solely due to its presence. It is to be noted, however, that the IR energy flux from conventional UV lamps is substantially higher than, for example, for usual daylight, so that good results can be achieved despite the fact that the absorption of IR is low for solar irradiation. Moreover, the actual overall concentration can be selected depending on the total layer thickness, also in view of some later required or desired heat absorption or radiation absorption and/or electrostatic properties of the finished compound glass.

The present invention also provides a correspondingly equipped compound glass itself, and an equipped casting resin, especially a transparent and liquid casting resin, especially on an acrylate or acrylic basis, which may consist, in particular, of a mixture of acrylic resin, acrylic acid and methyl methacrylate (for example, UVEKOL S 20 from the company Surface Specialties S.A./N.V., Drogenbos, NL). In this mixture, the proportion of acrylic resin is preferably within a range of from 50 to 70% by weight, the proportion of methyl methacrylate is preferably within a range of from 20 to 40% by weight, the proportion of acrylic acid is preferably within a range of from 10 to 20% by weight, and/or the proportion of 2-hydroxyethyl acrylate is within a range of from 0.1 to 5% by weight. Particular protection is also sought for casting resins and other UV-curable compositions in which an absorber content is especially on such a basis, especially ITO content and/or ATO content of below 0.4%, especially below 0.2%. With the invention, casting resins or other UV-reactive systems can be realized which do not serve for the preparation of compound glass, but offer advantages, for example, due to the very quick reactivity with UV light without the addition of amounts of TCO that influence IR properties of the final product or the like.

COMPARATIVE EXAMPLE

Two sheets of inorganic flat glass are fixed at a mutual distance of 1 mm and sealed at the edges. Then, a casting resin consisting of a conventional mixture of acrylic resin, acrylic acid and methyl methacrylate UVEKOL S 20 from the company Surface Specialties S.A. is poured into the gap. The feed hole is adhesively sealed. Now, the arrangement is exposed to UV light produced by a broad-band UV energy source, presently a UV curing unit from the company Beltron. It is established how many runs of irradiation with an energy of 5000 mJ/cm$^2$ are required until curing is complete. It is established that 8 runs are necessary.

EXAMPLE 1

Again, two glasses are arranged at a mutual distance as described above and sealed at the edges. Now, into the casting resin as employed above, 0.1% by weight of ITO is incorporated before the liquid casting resin is poured between the glasses. For a corresponding irradiation with runs of again 5000 mJ/cm$^2$ each in the UV curing unit, only four runs are required for complete curing.

Figure 2:
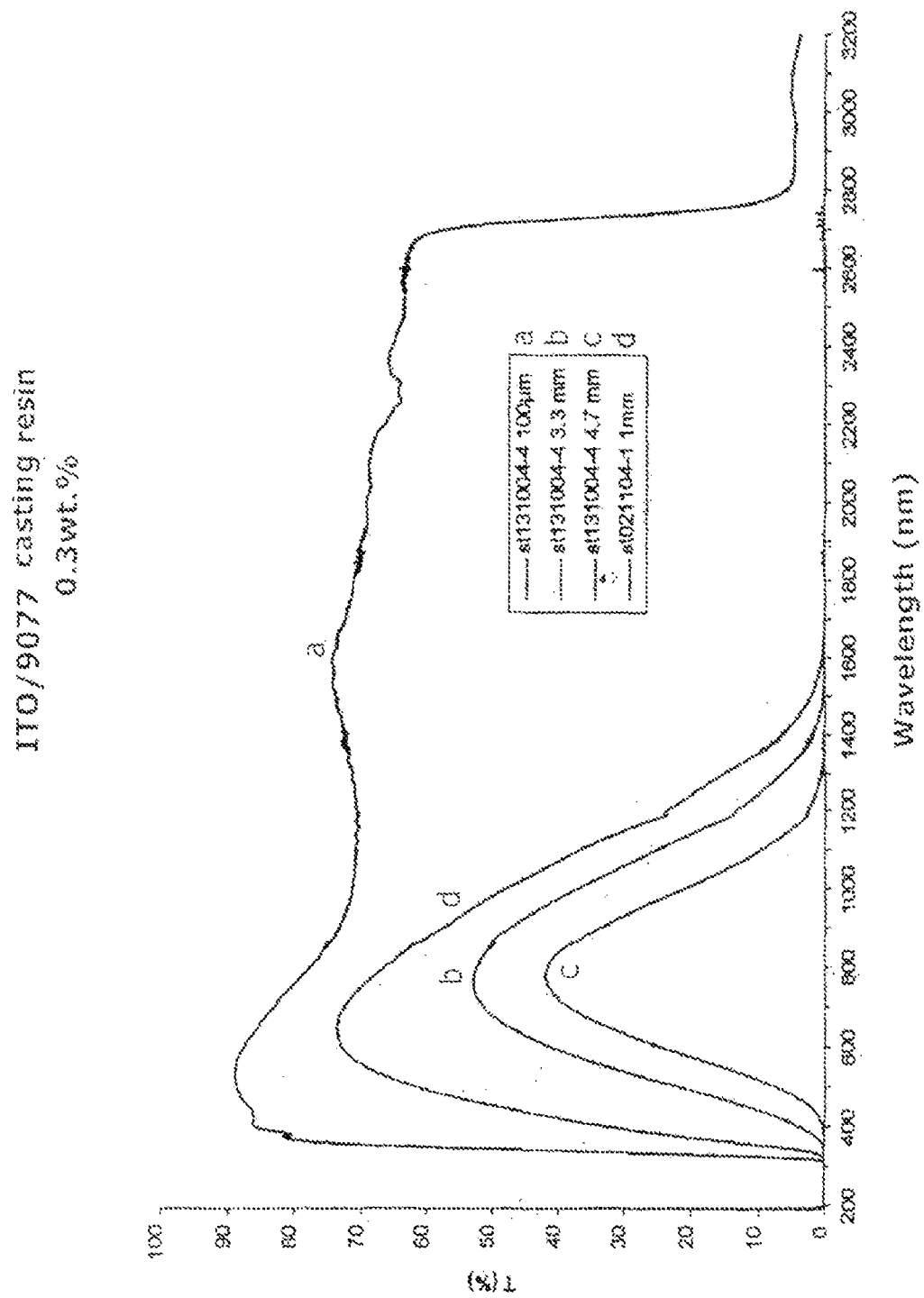
FIG. 2 shows the transmission through different layer thicknesses of casting resin for different layer thicknesses.

Then, transmission and adsorption curves of the finished compound are recorded for different layer thicknesses and ITO contents. For different thicknesses of 100 µm, 4.7 mm and 1 mm, the results are shown in FIG. 2 for different wavelengths. For technically relevant layer thicknesses, it can be seen that the transmission in the wavelength region of above about 1500 nm is significantly reduced.

FIG. 3 shows the influence of different indium tin oxide contents on transmission, wherein the topmost curve shows the transmission of the casting resin without an admixed infrared absorber.

EXAMPLE 2

Into a casting resin as in Example 1, 0.1% by weight of a nanocrystalline ATO (SnO$_2$:Sb) is incorporated. The transparent liquid was poured between two glasses that were sealed at the edges and had a mutual distance of 1 mm (=gap). After filling in the resin, the feed hole is adhesively sealed. The same was done with the unmodified resin.

For curing, both specimens were passed through a UV curing unit (Beltron company); the samples were exposed to an energy of 5000 mJ/cm$^2$ per run.

For the unmodified resin, 8 runs were necessary for complete curing. The resin containing ATO was completely cured after 5 runs.

EXAMPLE

An ATO powder is first encapsulated as an IR absorber as follows: A conventional ATO powder in an amount of 100 g is predispersed in 500 ml of deionized water. The dispersion is brought to a temperature of 75° C., and a pH of 8.5 is adjusted by adding dropwise an ammonia solution with 2 moles of NH$_3$ per liter. Then, with strong acoustic excitation (ultrasound) of the dispersion, a solution with a reactive orthosilicate is slowly added dropwise until the ratio of orthosilicate to ATO became a value of 1:4 after 90 min of dropping time. The dropwise addition is effected at a constant temperature and at a pH which is kept constant by adding a solution of hydrochloric acid with 2 moles of HCl per liter. After the dropwise addition is complete, the liquid is cooled down, the solid obtained is separated off by filtration, washed and then dried at 100° C. for three hours. The thus prepared substance is further employed as encapsulated ATO.

Then, into a casting resin as in Example 1, 0.15% by weight of this nanocrystalline ATO (SnO$_2$:Sb) provided with a glassy encapsulation is incorporated; the proportion of the encapsulation was 20% by weight of the total mass of the powder. The resulting transparent liquid was poured between two glasses that were sealed at the edges and had a mutual distance of 1 mm(=gap). After filling in the resin, the feed hole is adhesively sealed. The same was done with the unmodified resin.

For curing, both specimens were passed through a UV curing unit (Beltron company); the samples were exposed to an energy of 5000 mJ/cm$^2$ per run.

For the unmodified resin, 8 runs were necessary for complete curing. The resin containing the encapsulated ATO was completely cured after 5 runs.

Due to the encapsulation, especially glassy encapsulation, of the inorganic IR absorber, here nanocrystalline TCO, the cured composition behaves just like compositions without such addition in biological terms, so that it can be employed for use in food etc. it is obvious that the encapsulation is here positive for use in the food, pharma or similar fields irrespective of the actually encapsulated material, and for any UV-reactive compositions, the addition of encapsulated IR absorbers is advantageous for curing and for shortening the irradiation time.

FIG. 1 illustratively shows measuring curves recorded on ITO layers of nano-ITO. Thus, the sample is transparent only in the visible region (VIS) and has a very low reflectance. The curve of absorption can be calculated therefrom. In this concrete Example, 5 g/m$^2$ of nano-ITO was employed. This is a substantially higher amount than that usually employed, only in order to render the principle of action clearer. It becomes clear that energy is taken up both in the UV and IR regions and can be converted to heat.

A dispersion of n-ITO (nano-indium tin oxide, Nanogate Advanced Materials GmbH, Saarbrücken, Germany) was mixed with a transparent liquid casting resin consisting of acrylic resin, acrylic acid and methyl methacrylate UVEKOL S 20 from the company Surface Specialties S.A. The ITO content were at concentrations of lower than 1% by weight, based on the total amount in the total material. Such a resin was brought between two glasses, with the aim to adhesively bond the glasses into a transparent composite (preparation of compound glasses). The curing of the resin is effected by UV irradiation.

Into the mentioned casting resin, 0.1% by weight of ITO was incorporated. The transparent liquid was poured between two glasses that were sealed at the edges and had a mutual distance of 1 mm. After filling in the resin, the feed hole is adhesively sealed. The same was done with the unmodified resin. For curing, both specimens were passed through a UV curing unit (Beltron company). The samples were exposed to an energy of 5000 mJ/cm$^2$ per run. For the unmodified resin, 8 runs were necessary for complete curing. The resin containing ITO was completely cured after 4 runs.

FIG. 2 shows measuring curves of similarly prepared compound glasses in which the content of n-ITO was adjusted to 0.3% by weight and the layer thickness of the resin layer was varied from 0.1 to 4.7 mm. The curves depicted at a respectively higher position in the diagram correspond to a lower layer thickness. Thus, for example, the topmost curve corresponds to a layer thickness of 0.1 mm.

FIG. 3 shows measuring curves of similarly prepared compound glasses in which the content of n-ITO was varied from 0 to 0.25% by weight while the layer thickness of the resin layer was 1 mm. The topmost curve corresponds to the specimen with pure resin without n-ITO. The remaining curves correspond to the different contents of n-ITO, wherein the curves shown at a lower position respectively correspond to a higher content of n-ITO.

The invention claimed is:

1. A curable acrylic or acrylate resin composition comprising:
   a substantially transparent infrared absorber selected from ATO, ITO, ZnO, LaB$_6$ and a mixture of these substances in a total amount of from 0.005% to 5% by weight of the composition for accelerating the UV curing of the composition.

2. The composition according to claim 1, wherein said infrared absorber is employed in an amount of below 0.2% by weight of the composition.

3. The composition according to a claim 1, wherein at least one inorganic UV absorber and at least one organic or inorganic infrared absorber are employed.

4. A substantially transparent infrared absorbing composition to be used in a resin comprising from about 0.005% to about 5% by weight of the composition of a material selected from the group consisting of ATO, ITO, ZnO, LaB$_6$ and mixtures thereof, said material being capable of accelerating the UV curing of the resin.

5. The composition according to claim 4, wherein said infrared absorber is employed in an amount of below 0.2% by weight of the composition.

6. The composition according to claim 4 or 5 wherein at least one inorganic UV absorber and at least one organic or inorganic infrared absorber are employed.

* * * * *